United States Patent [19]

Kakii et al.

[11] Patent Number: 4,721,586
[45] Date of Patent: Jan. 26, 1988

[54] METHOD OF MOLDING PLUGS FOR OPTICAL FIBER CABLES

[75] Inventors: Toshiaki Kakii; Naoshi Hakamata; Shuzo Suzuki, all of Kanagawa, Japan

[73] Assignee: Sumitomo Electric Industries, Ltd., Osaka, Japan

[21] Appl. No.: 839,394

[22] Filed: Mar. 14, 1986

[30] Foreign Application Priority Data

Mar. 15, 1985 [JP] Japan ................. 60-52956

[51] Int. Cl.[4] .............. B29D 11/00; G02B 6/44
[52] U.S. Cl. ................... 264/1.5; 264/152; 264/157; 264/277
[58] Field of Search ............ 264/1.5; 350/96.22

[56] References Cited

U.S. PATENT DOCUMENTS

| | | | |
|---|---|---|---|
| 3,871,935 | 3/1975 | Gloge et al. | 264/1.5 |
| 4,123,137 | 10/1978 | Marcatili | 350/96.22 |
| 4,333,705 | 6/1982 | Mead | 264/1.5 |
| 4,341,439 | 7/1982 | Hodge | 350/96.22 |
| 4,416,507 | 11/1983 | Hulin | 350/96.22 |

FOREIGN PATENT DOCUMENTS

| | | | |
|---|---|---|---|
| 25847 | 2/1979 | Japan | 350/96.22 |
| 160248 | 12/1979 | Japan | 350/96.22 |
| 160249 | 12/1979 | Japan | 350/96.22 |
| 40806 | 4/1981 | Japan | 264/1.5 |

*Primary Examiner*—James Lowe
*Attorney, Agent, or Firm*—Sughrue, Mion, Zinn, Macpeak & Seas

[57] ABSTRACT

An optical fiber cable plug manufacturing method providing easy connection between large numbers of optical fibers. The protective cover layer of an optical fiber cable is removed from its middle part to expose the coated optical fibers and the tensile strength member, and the tensile strength member is cut into two parts. Then, the coated optical fibers thus exposed are partially uncoated. Coupling members are disposed along the exposed parts of the optical fibers and molded together with the optical fibers with resin to provide a molding. The molding is cut perpendicularly to its longitudinal axis into two symmetrical parts, and the cut end faces are polished to provide two symmetrical optical fiber cable plugs.

11 Claims, 16 Drawing Figures

METHOD OF MOLDING PLUGS FOR OPTICAL FIBER CABLES

BACKGROUND OF THE INVENTION

The present invention relates to optical fiber cables, and more particularly to a method of manufacturing plugs for optical fiber cables.

As shown in FIG. 1, in a conventional optical fiber cable 51 with optical connectors 53, the optical connectors 53 are connected to the ends of the respective coated optical fibers. Even in the case of a multi-fiber type optical fiber cable composed of tape-shaped optical fiber lines, one optical connector is used at most for every five optical fibers. For instance, in the cases of a 600-conductor type optical fiber cable and a 3000-conductor type optical fiber cable, it is necessary to connect 120 optical connectors and 600 optical connectors, respectively. Accordingly, the following difficulties accompany such multi-fiber type optical fiber cables:

(1) If 100 or more optical connectors are connected to the ends of the coated optical fibers of an optical fiber cable, the end of the cable is considerably bulky, which obstructs the installation and transportation thereof.

(2) In the case where optical fiber cables with 600 optical connectors or more are to be installed, the optical connectors are liable to become entangled with one another. Therefore, even if the optical connectors are detachable, the connector coupling work is rather troublesome.

(3) Furthermore, even if the connector coupling work is successfully accomplished, the joints formed by coupling the connectors together are considerably large in size. Therefore, in the case where it is required to lay optical fiber cables in a narrow place such as in a manhole, it is essential to reduce the size of the joints.

(4) A series of operations for connecting about 600 connectors to the optical fibers and polishing the end faces of the connectors requires much time and expense.

Accordingly, in order to decrease the manufacturing cost of a multi-fiber type optical fiber cable with a number of optical connectors, it has been necessary to develop an optical connector of novel structure.

SUMMARY OF THE INVENTION

Accordingly, an object of the invention is to eliminate the above-described difficulties accompanying a multi-fiber type optical fiber conductor having a large number of optical connectors.

The foregoing object and other objects of the invention have been achieved by the provision of an optical fiber cable plug manufacturing method which, according to the invention, comprises the steps of: removing the protective cover layer of an optical fiber cable from a middle part thereof to expose the coated fibers and the tensile strength member of the optical fiber cable; cutting the tensile strength member into two parts; partially stripping the coating of the coated optical fibers to expose the bare optical fibers; providing positioning coupling members along the exposed parts of the coated optical fibers; molding the positioning coupling members and the coated optical fibers including the exposed parts thereof with resin to provide a molding; cutting the molding perpendicularly to the axis thereof into two substantially equal parts; and polishing the cut end faces thereof to form symmetrical plugs.

The nature, principle and utility of the invention will become more apparent from the following description and the accompanying claims when read in conjunction with the accompanying drawings.

DESCRIPTION OF THE PREFERRED EMBODIMENTS

An optical fiber cable plug manufacturing method according to the invention will be described with reference to FIGS. 2A to 2I.

Figure 2A:
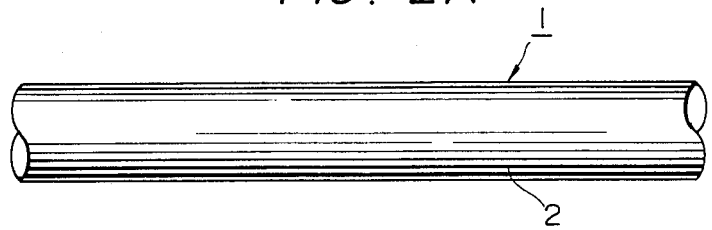
FIGS. 2A through 2I are explanatory diagrams for a description of the steps of manufacturing optical cable plugs according to an optical fiber cable plug manufacturing method of the invention.
Figure 2B:
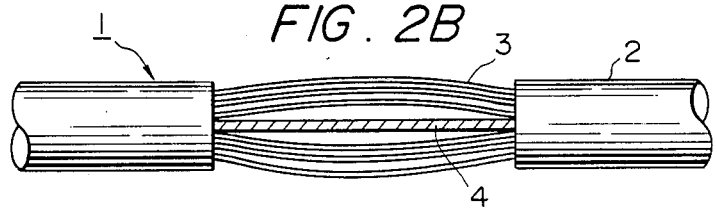

A protective cover layer and an intermediate member, generally indicated at 2, are removed from a part of a long optical fiber cable 1 as shown in FIG. 2A, and the coated optical fibers 3 thereof are untwisted so that the coated optical fibers 3 and a tensile strength member 4 are exposed as shown in FIG. 2B.

Figure 2C:
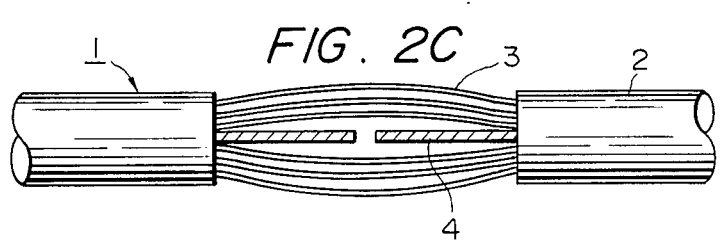
Figure 2D:
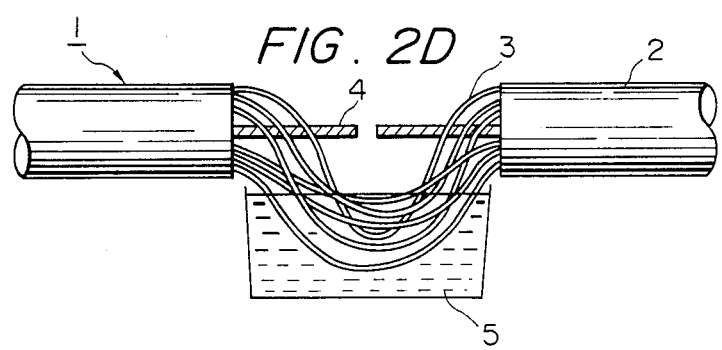
Figure 2E:
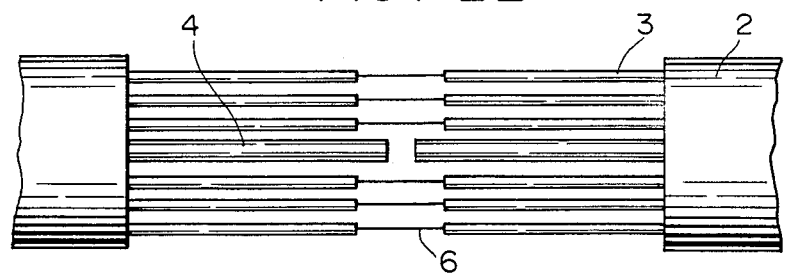

Thereafter, the tensile strength member 4 is cut as shown in FIG. 2C, and the coated optical fibers 3 are slackened by holding the optical fiber cable 1 in such a manner that the remaining protective cover layers 2 are set close to each other. Under this condition, the coated optical fibers 3 are immersed in, for instance, hot sulfuric acid 5 as shown in FIG. 2D so that the outer coating of each coated optical fiber is partially removed to expose the optical fibers 6 as shown in FIG. 2E.

Figure 2F:
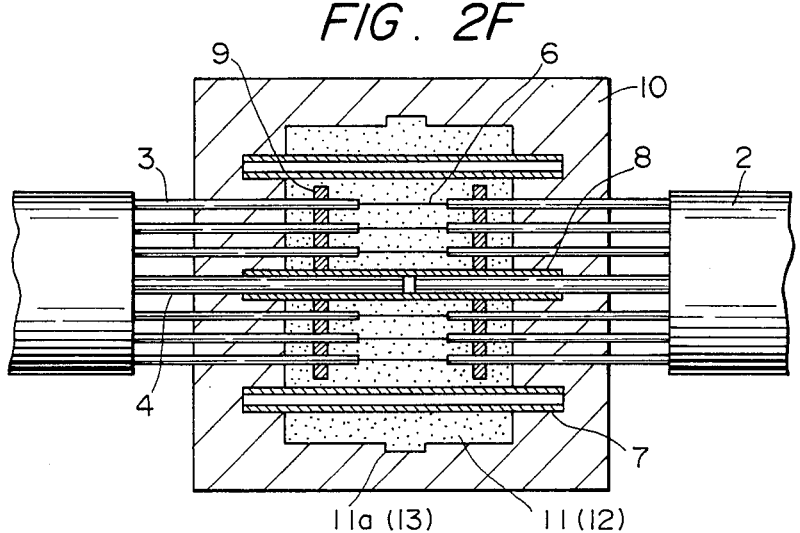
Figure 5A:
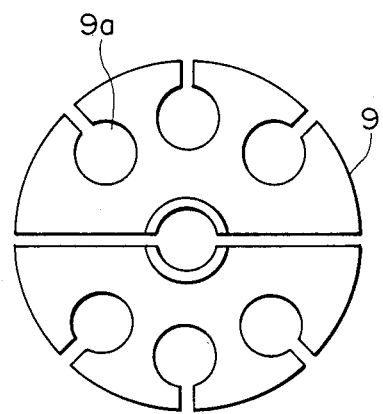
FIGS. 5A and 5B are a front view and a side view, respectively, showing a split-type spacer.
Figure 5B:
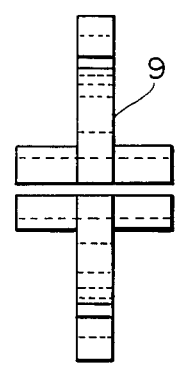

Then, as shown in FIG. 2F, the tensile strength members 4 are inserted into a pipe 8, such as a metal pipe or a plastic pipe, and positioning coupling members 7, such as metal pipes the inner walls of which have been machined with high precision, are set in a metal mold 10. In this connection, it is preferable for the cavity 11 of the metal mold 10 to have a protrusion 11a so that, when a molding 12 (FIG. 2G) is cut into two parts (FIG. 2H), flanges 13 are formed at the cut ends. Furthermore, in order to arrange the coated optical fibers 3 in order, it is preferable to employ a split-type spacer 9 as shown in FIG. 5. The coated optical fibers 3 are divided into a plurality of groups which are held in the grooves 9a of the spacer 9.

Figure 2G:
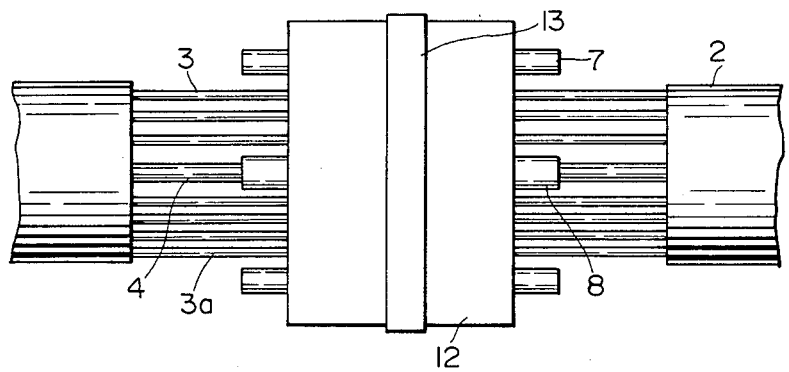

Under this condition, molding resin, such as epoxy resin, is poured into the metal mold 10, and hence the molding 12 as shown in FIG. 2G is obtained. The molding 12 thus obtained is cut along a plane perpendicular to the longitudinal axis thereof to provide two substantially equal parts, namely, plugs. The cut end faces of the plugs are polished. Thus, optical cable plugs 14 are formed which can be connected to the ends of optical fiber cables.

Figure 2H:
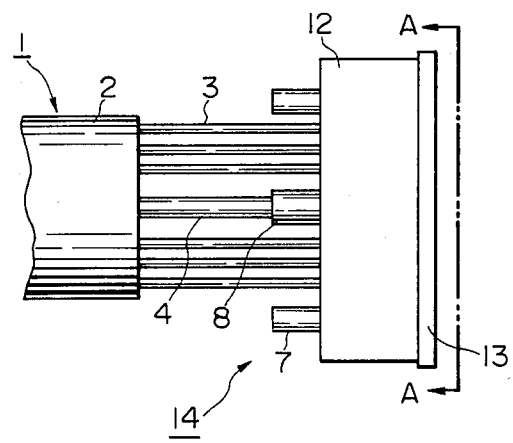
Figure 2I:
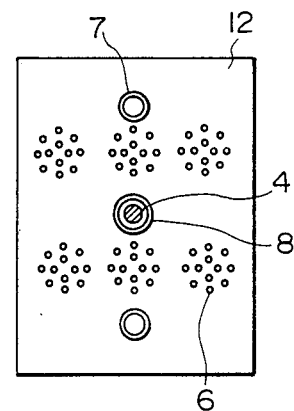

FIG. 2H is a side view of one of the two plugs 14, and FIG. 2I is a diagram of the plug 14 viewed in the direction of an arrow A—A. In FIG. 2H, reference numeral 13 designates the aforementioned flange formed at the end of the plug 14.

In forming the optical fiber cable plug, an auxiliary coated optical fiber 3a about 3 m in length is also molded, so that if one of the other optical fibers of the plug becomes defective, it can be readily replaced by connecting the auxiliary coated optical fiber 3a.

Further, if, in each coated optical fiber, the outer coating is sufficiently strongly bonded to the optical fiber to the extent that the plug is positively joined to the coated optical fibers, then the coated optical fibers may be molded without removing these coatings therefrom.

Figure 1:
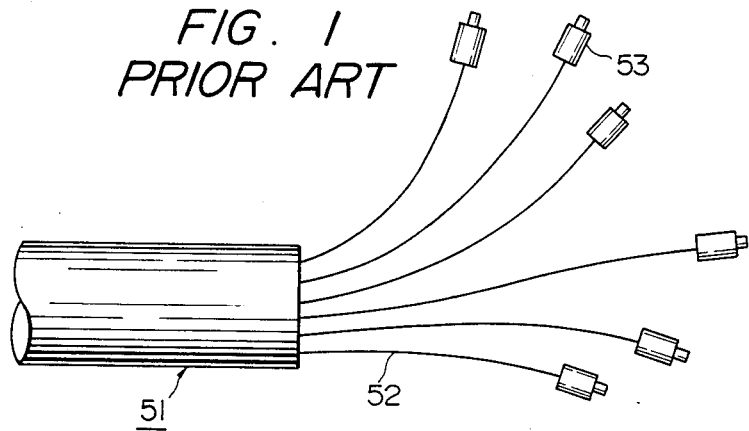
FIG. 1 is an explanatory diagram showing a conventional optical fiber cable with optical connectors.
Figure 3A:
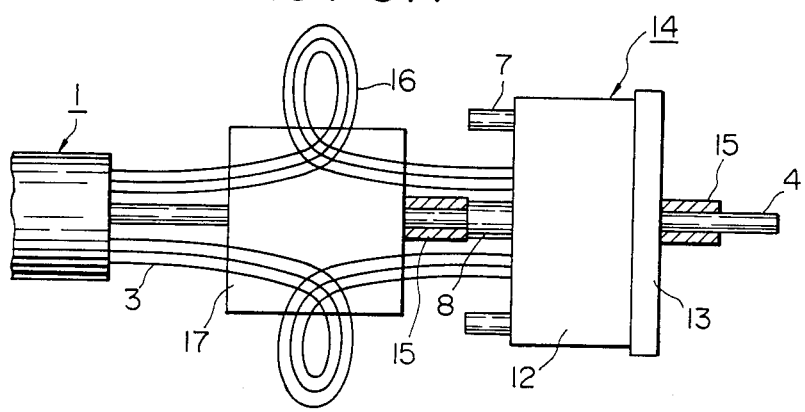
FIG. 3A is an explanatory diagram for a description of the provision of an excess length receiving member for the plug formed according to the method of the invention.
Figure 3B:
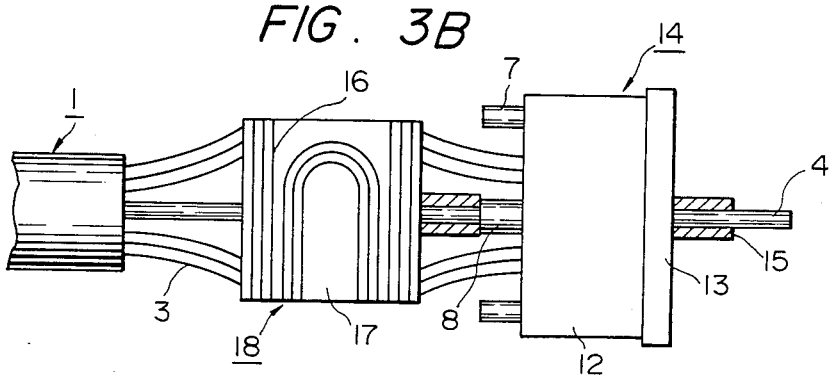
FIG. 3B is a side view of the plug of FIG. 3A with the excess length receiving member.

FIGS. 3A and 3B show an excess length receiving device 18 provided between the optical fiber cable plug 14 manufactured as described above and an optical fiber cable 1. The device 18 is used to receive excess lengths of the coated optical fibers 3. When the optical fiber cable plug 14 is moved towards the optical fiber cable 1, the coated optical fibers 3 are slackened, as indicated at 16 in FIG. 3A. In the excess length receiving device 18, the slackened parts 16 of the coated optical fiber 3 are wound on a grooved bobbin 17, which is mounted on the tensile strength member 4 as shown in the FIG. 3B.

Figures 4A, 4B:
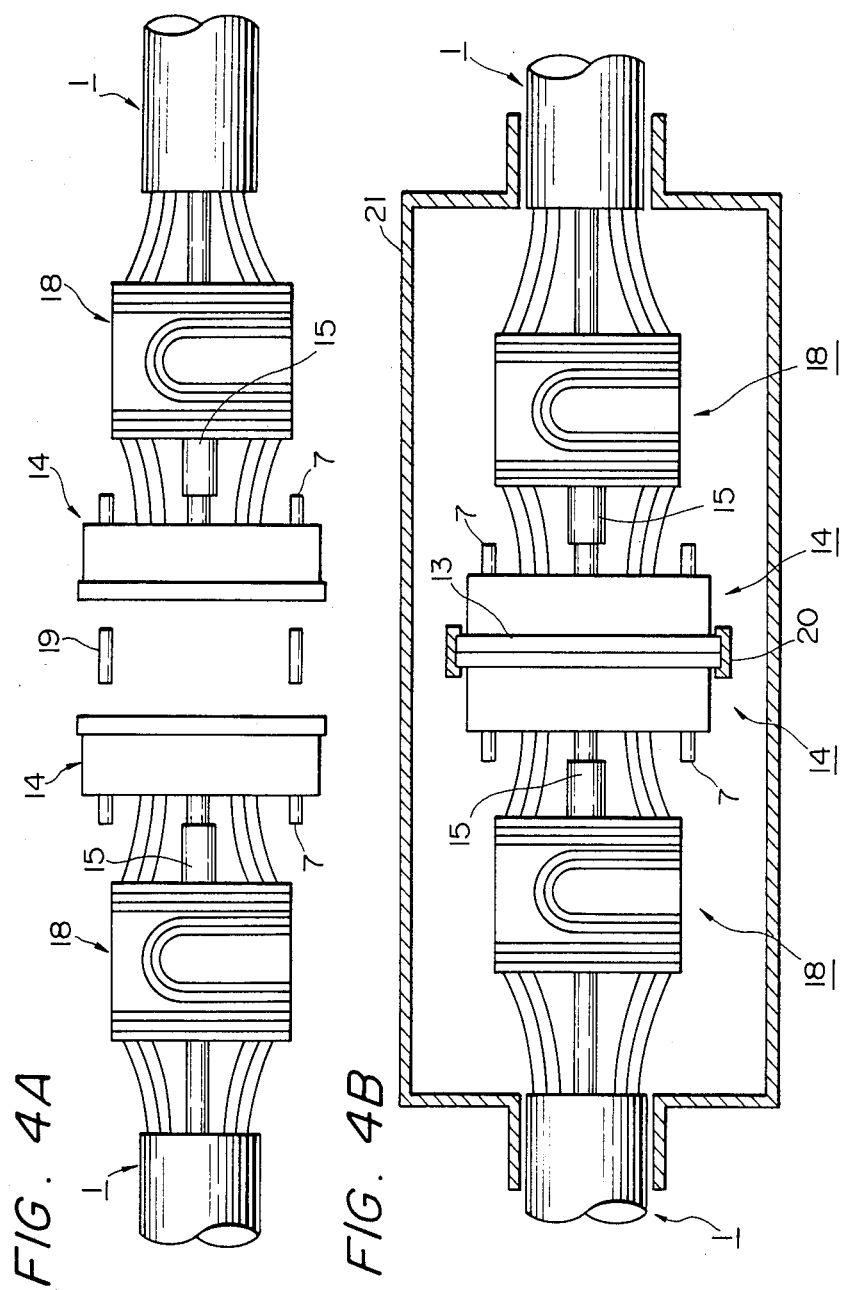
FIG. 4A is an explanatory diagram showing a method of joining the plugs shown in FIG. 3B.
FIG. 4B is a side view, partly as a sectional view, showing a joint formed by joining the plugs of FIG. 4A together.

FIG. 4A is an explanatory diagram illustrating a method of forming a connecting part of optical fiber cables 1 with optical fiber cable plugs 14 with the excess length receiving device 18 manufactured according to the invention, and FIG. 4B is a side view, partly as a sectional view, of the connecting part of the optical fiber cables 1.

As shown in FIGS. 4A and 4B, the two optical fiber cable plugs 14 are aligned with each other, and guide pins 19 whose outside diameters are nearly equal to the inside diameters of the respective positioning coupling members 7 are inserted into the latter to couple the two optical fiber cable plugs 14 together. Thereafter, the two plugs are fixedly joined together with clips 20 and are engaged in a protective case 21 as shown in FIG. 4B.

A specific example of the optical fiber cable plug manufacturing method according to the invention will be described with reference to a 600-conductor optical fiber cable. The 600-conductor type optical fiber cable includes 120 tape-shaped five-conductor type coated optical fiber lines.

As shown in FIG. 2C, the protective cover layer and the intermediate members such as spacers of the 600-conductor optical fiber cable were removed from a part thereof, the tape-shaped coated optical fiber lines were untwisted, and the tensile strength member was cut into two parts so that about 1 m of the tape-shaped coated optical fiber lines were exposed. Thereafter, the outer coatings of the 120 tape-shaped coated optical fiber lines were removed from substantially the middle parts thereof by immersing them in hot sulfuric acid solution to expose about 20 mm of the optical fibers.

Thereafter, the tape-shaped coated optical fiber lines were arranged in order by inserting them in the grooves of the spacer with 20 tape-shaped coated optical fiber lines per groove, and were then set in the metal mold. In this operation, as described above, the tensile strength members were inserted into a suitable metal pipe, and two stainless steel pipes machined to precisely 10 mm in inside diameter and 60 mm in length were set in the metal mold.

Liquid-phase epoxy resin was poured into the metal mold and hardened at 90° C. for one hour. The molding was removed from the metal mold and cut along a plane perpendicular to the axis of the molding to provides two substantially equal parts. The cut end faces of the two parts were polished in three steps, coarse polishing, intermediate polishing and fine polishing. As a result, optical cable plugs as shown in FIG. 2H were formed. Each of the plugs was 45 mm in diameter and had a flange 55 mm in diameter at the end.

As the tensile strength member was inserted into the metal pipe and was not in close contact with the molding, namely, the optical cable plug, the latter was polished with the tensile strength retracted from the end face of the plug.

The optical cable plugs thus formed, after being assembled with the excess length receiving members, were aligned with each other. Under this condition, the two plugs were coupled together using two guide pins, the outside diameters of which were nearly equal to the inside diameter (10 mm) of the stainless steel pipes, and were fixed together with clips engaged with the flange.

The connection loss of the resulting assembly was measured. The average connection loss was about 0.12 dB, the minimum connection loss was 0.02 dB, and the maximum connection loss was 0.32 dB (with a matching agent applied to the connecting parts). This is much smaller than the connection loss, about 0.4 dB, of an ordinary multi-fiber optical fiber connector; that is, it is as small as that of a good splice. The total time required for performing the coupling work was about 12 minutes. This is equivalent to connecting 120 conventional plugs in a time of about 6 seconds per plug (clearly impossible with the conventional technique). That is, the total coupling time is greatly decreased.

Furthermore, the temperature characteristic in a range of from $-30°$ C. to $+70°$ C. was found to be excellent, being less than 0.2 dB in variation width. In addition, in a 24-hour test of $\pm 2$ mm, 10 Hz vibration, the loss variation was not more than 0.1 dB. Thus, the optical fiber cable connecting part of the invention is considerably stable.

In forming 120 optical cable plugs for a 600-conductor optical fiber cable, the period of time required for the work from removing the protective cover layer from the cable to removing the molding from the metal mold was about six hours. That is, because each plug was connected in about three minutes, the total time required for making all connections was reduced to about 1/10 that required in the conventional method.

The tensile strength members may be fixedly secured to the protective case, or they may be indirectly secured to the protective case by fixing the excess length receiving members to the case.

The optical fiber cable plug manufacturing method of the invention has the following effects and merits:

(1) Plugs for a multi-fiber optical fiber cable, such as a 600-conductor optical fiber cable, can be provided as one unit. Therefore, an optical fiber cable with a compact connector can be realized according to the invention. Accordingly, cables manufactured according to the invention can be readily transported and can be laid as optical fiber cables with connectors in cable lines. At the site of installation, 600 conductors can be connected in one action; that is, the total time required for connection of the optical fiber cables can be greatly reduced, and the connecting parts are considerably small in size.

(2) According to the invention, connecting plugs can be formed even for an optical fiber cable the number of optical fibers of which is of the order of 600, which achieves a substantial reduction of cost in the installation of the optical fiber cables and aids in the mass production of optical fiber cables.

(3) According to the invention, an excess length receiving member if provided together with the plug, and the auxiliary coated optical fiber is also molded in forming the plug. Therefore, when any one of the optical fibers in the cable becomes defective, it can be readily replaced with the auxiliary coated optical fiber by connecting the former to the latter.

(4) According to the invention, a flange is formed at the end face of the plug. Therefore, the two plugs can be positively joined together with bolts and nuts or clamps.

(5) A number of coated optical fibers are divided into several groups by the spacer. That is, they are molded at the ends after being arranged in order to some extent. Therefore, the inspection, measurement and evaluation thereof can be readily achieved.

(6) The plugs are formed after the tensile strength members have been inserted into the pipe, the tensile strength members are not in close contact with the plug. Therefore, the excess length parts can be provided in the optical fibers by moving the optical fiber cable plug relative to the tensile strength member in such a manner that the latter is made to protrude from the plug. Furthermore, a cable pulling metal member can be connected to the protruding tensile strength member.

(7) With tensile strength member extended along the central axis of the optical fiber cable plug as described above, the tensile strength member can firmly hold the plug. Furthermore, by connecting a stopper (15) to the tensile strength member, the optical fiber cable plug can be fixedly positioned at a desired position. This advantage can be effectively utilized in the case where the cable is shaken or vibrated during installation. In addition, after the plugs have been joined together, the connecting parts can be fixedly positioned with respect to the cable.

We claim:

1. A method for manufacturing optical fiber cable plugs from a longitudinally extending optical fiber cable containing a plurality of coated optical fibers and a tensile strength member, said method comprising the steps of:
    removing a protective cover layer (2) of said optical fiber cable (1) from a middle part thereof to expose portions of said coated optical fibers (3) and said tensile strength member (4);
    cutting said tensile strength member into two parts;
    inserting said parts of said tensile strength member into a pipe (8);
    providing positioning coupling members (7) along said exposed portions of said optical fibers, wherein said positioning coupling members comprise a plurality of metal pipes, inner circumferential walls of which are machined with high precision;
    molding said positioning coupling members and said coated optical fibers including said exposed portions thereof, and said two parts of said strength member and said pipe, with resin to provide a single molding member (12); and
    cutting said molding member along a plane perpendicular to a longitudinal axis thereof into two substantially equal parts.

2. The method as claimed in claim 1, further comprising the step of partially stripping an outer coating of said optical fibers to expose bare optical fibers (6) to said step of molding.

3. The method as claimed in claim 1, in which said coated optical fibers (3a) are molded with resin together with an auxiliary coated optical fiber.

4. The method as claimed in claim 1, further comprising the step of, after said molding is cut into two substantially equal parts, forming a flange (13) at each of said cut end faces.

5. The method as claimed in claim 1, in which said coated optical fibers are divided into a plurality of groups of coated optical fibers, and wherein at least some of said plurality of groups of coated optical fibers are molded separately.

6. The method as claimed in claim 1, in which said coated optical fibers are divided into a plurality of groups of coated optical fibers and are molded with said plurality of groups of coated optical fibers held separately by a split-type spacer (9).

7. The method as claimed in claim 1, in which said plug is fixed with a stopper (15) coupled to said tensile strength member.

8. The method as claimed in claim 1, in which a member (18) for receiving excess length parts of said coated optical fibers is provided between said plug and said optical fiber cable.

9. The method as claimed in claim 1, wherein end portions of said positioning coupling members protrude from said molding member.

10. The method as claimed in claim 1, wherein said tensile strength member in said pipe is movable longitudinally with respect to said plug.

11. A method for manufacturing optical fiber cable plugs from a longitudinally extending optical fiber cable containing a plurality of uncut coated optical fibers (3) and a tensile strength member (4), said method comprising the steps of:
    removing a protective cover layer (2) of said optical fiber cable (1) from a middle part thereof to expose portions of said plurality of said uncut coated optical fibers and said tensile strength member;
    cutting said tensile strength member into two parts;
    inserting said two parts of said tensile strength member into respective open ends of a pipe (8);
    providing positioning coupling members (7) along exposed parts of said plurality of said uncut optical fibers, wherein said positioning coupling members comprise a plurality of metal pipes, inner circumferential walls of which are machined with high precision;
    molding said positioning coupling members and said plurality of said uncut coated optical fibers including said exposed portions thereof, and said two parts of said strength member and said pipe, with resin to provide a single molding member; and
    cutting said molding member along a plane perpendicular to a longitudinal axis thereof into two substantially equal parts,
    whereby said position coupling members, said pipe and said plurality of said optical fibers are cut, and two of said optical fiber cable plugs are formed.

* * * * *